(12) United States Patent
Carnevali et al.

(10) Patent No.: US 11,289,864 B2
(45) Date of Patent: Mar. 29, 2022

(54) CASES FOR MOBILE DEVICES WITH A FLEXIBLE COVERING AND RIGID FRAME OR WITH TWO DIFFERENT CONNECTOR ARRANGEMENTS AND METHODS OF MAKING AND USING

(71) Applicant: National Products, Inc., Seattle, WA (US)

(72) Inventors: Jeffrey D. Carnevali, Seattle, WA (US); Jake Parker, Seattle, WA (US); Scott Anderson, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 16/853,544

(22) Filed: Apr. 20, 2020

(65) Prior Publication Data
US 2021/0328394 A1    Oct. 21, 2021

(51) Int. Cl.
*H01R 33/94* (2006.01)
*G06F 1/16* (2006.01)
(Continued)

(52) U.S. Cl.
CPC ........... *H01R 33/94* (2013.01); *G06F 1/1628* (2013.01); *H01R 13/516* (2013.01);
(Continued)

(58) Field of Classification Search
CPC ........... G06F 2200/1633; G06F 1/1626; G06F 1/1632; G06F 1/1633; G06F 1/1628;
(Continued)

(56) References Cited

U.S. PATENT DOCUMENTS

| 809,977 A | 1/1906 | O'Brien |
| 1,786,459 A | 12/1930 | Simons |

(Continued)

FOREIGN PATENT DOCUMENTS

| CN | 101674096 | 3/2010 |
| CN | 202268924 | 6/2012 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Abdullah A Riyami
*Assistant Examiner* — Justin M Kratt
(74) *Attorney, Agent, or Firm* — Branch Partners PLLC; Bruce E. Black (57) ABSTRACT

A case for a mobile device includes a flexible covering defining a cavity for receiving and holding the mobile device; a rigid frame at least partially disposed within the flexible covering; and an adapter disposed at least partially within the rigid frame and the flexible covering, the adapter including first contacts, a male plug extending into the cavity, and second contacts disposed on the male plug and electrically coupled to the first contacts; where the adapter, in combination with at least one of the flexible covering or the rigid frame, defines a first male structure extending away from the cavity, where the first contacts of the adapter are disposed on the first male structure. Another case includes at least the flexible covering and adapter and also includes a female connector electrically coupled to the second contacts and having an opening disposed on the first male structure.

20 Claims, 8 Drawing Sheets

(51) Int. Cl.
  *H01R 13/516* (2006.01)
  *H01R 33/975* (2006.01)
  *H01R 12/72* (2011.01)
  *H01R 13/62* (2006.01)
  *H04B 1/3888* (2015.01)
  *H04M 1/72409* (2021.01)
  *A45C 11/00* (2006.01)
  *A45C 13/10* (2006.01)
  *G06F 1/26* (2006.01)
  *G06F 1/18* (2006.01)
  *A45C 13/00* (2006.01)
  *H01R 11/30* (2006.01)
  *H04M 1/18* (2006.01)

(52) U.S. Cl.
  CPC .......... *H01R 33/975* (2013.01); *A45C 13/008* (2013.01); *A45C 13/1069* (2013.01); *A45C 2011/002* (2013.01); *A45C 2011/003* (2013.01); *G06F 1/1613* (2013.01); *G06F 1/1626* (2013.01); *G06F 1/1633* (2013.01); *G06F 1/1656* (2013.01); *G06F 1/181* (2013.01); *G06F 1/26* (2013.01); *G06F 2200/1633* (2013.01); *H01R 11/30* (2013.01); *H01R 12/722* (2013.01); *H01R 13/6205* (2013.01); *H04B 1/3888* (2013.01); *H04M 1/185* (2013.01); *H04M 1/72409* (2021.01)

(58) Field of Classification Search
  CPC ........ G06F 1/1656; G06F 1/1613; G06F 1/26; G06F 1/181; H04M 1/185; H04M 1/72409; H01R 13/6205; H01R 11/30; H01R 33/94; H01R 13/516; H01R 33/975; H01R 12/722; H04B 1/3888; A45C 2011/002; A45C 2011/003; A45C 13/008; A45C 13/002; A45C 13/1069
  USPC ......................................................... 439/638
  See application file for complete search history.

(56) References Cited

U.S. PATENT DOCUMENTS

| | | |
|---|---|---|
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 8/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,406,758 B1 | 6/2002 | Bottari et al. |
| 6,407,860 B1 | 6/2002 | Funazaki et al. |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,351,066 B2 | 4/2008 | DiFonzo et al. |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,594,576 B2 | 9/2009 | Chen et al. |
| 7,609,512 B2 | 10/2009 | Richardson et al. |
| 7,612,997 B1 | 11/2009 | Diebel et al. |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| 7,889,489 B2 | 2/2011 | Richardson et al. |

(56) References Cited

U.S. PATENT DOCUMENTS

| | | | |
|---|---|---|---|
| 7,901,216 B2 | 3/2011 | Rohrbach et al. |
| 7,907,394 B2 | 3/2011 | Richardson et al. |
| 8,061,516 B2 | 11/2011 | Carnevali |
| 8,074,951 B2 | 12/2011 | Carnevali |
| 8,087,939 B2 | 1/2012 | Rohrbach et al. |
| 8,099,138 B2 | 1/2012 | Piekarz |
| 8,172,580 B1 | 5/2012 | Chen et al. |
| 8,177,560 B2 | 5/2012 | Rohrbach et al. |
| 8,183,825 B2 | 5/2012 | Sa |
| 8,224,408 B2 | 7/2012 | Tomasini et al. |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,483,758 B2 | 7/2013 | Huang |
| 8,497,753 B2 | 7/2013 | DiFonzo et al. |
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1* | 9/2014 | Gudino .............. A45C 11/00 455/575.8 |
| 8,891,800 B1 | 11/2014 | Shaffer |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,970,332 B2 | 3/2015 | DiFonzo et al. |
| 9,026,187 B2 | 5/2015 | Huang |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,172,781 B1 | 10/2015 | Goldstein |
| 9,356,267 B1 | 5/2016 | To et al. |
| 9,647,474 B2 | 5/2017 | Fathollahi et al. |
| 9,913,517 B2* | 3/2018 | Poon .................. A45C 11/00 |
| 2004/0108348 A1 | 6/2004 | Barnes |
| 2005/0189354 A1 | 9/2005 | Heather et al. |
| 2006/0058073 A1 | 3/2006 | Kim |
| 2006/0175766 A1 | 8/2006 | Carnevali |
| 2009/0160400 A1 | 6/2009 | Woud |
| 2009/0314400 A1 | 12/2009 | Liu |
| 2012/0018325 A1 | 1/2012 | Kim |
| 2012/0043235 A1 | 2/2012 | Klement |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0331156 A1 | 12/2013 | Lui |
| 2013/0334071 A1 | 12/2013 | Carnevali |
| 2015/0146401 A1 | 5/2015 | Su et al. |
| 2015/0189780 A1 | 7/2015 | Su et al. |
| 2016/0309010 A1* | 10/2016 | Carnevali ............. H04M 1/185 |
| 2017/0227987 A1 | 8/2017 | Carnevali et al. |
| 2020/0068057 A1 | 2/2020 | Lei |

FOREIGN PATENT DOCUMENTS

| | | |
|---|---|---|
| CN | 204408423 | 6/2015 |
| JP | 2004-349969 | 12/2004 |
| TW | 2003TW531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico ©PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

Invitation to Pay Additional Fees and, Where Applicable, Protest Fee for PCT Application No. PCT/US2021/027928 dated Aug. 3, 2021.

International Search Report and Written Opinion for PCT Application No. PCT/US2021/027928 dated Sep. 24, 2021.

RAM Mounts: "IntelliSkin for Samsung 1-11 Galaxy S7—GOS Technology(TM)", Apr. 7, 2017 (Apr. 7, 2017), pp. 1-5, XP054981981, Retrieved from the Internet: URL:https://www.youtube.com/watch?v=HD5AWy j i fK0 [retrieved on Jun. 28, 2021].

* cited by examiner

CASES FOR MOBILE DEVICES WITH A FLEXIBLE COVERING AND RIGID FRAME OR WITH TWO DIFFERENT CONNECTOR ARRANGEMENTS AND METHODS OF MAKING AND USING

FIELD

The present invention is directed to cases for a mobile device. The present invention is also directed to a case for a mobile device that includes a flexible covering, a rigid frame, and an adapter with contacts that electrically couple to the mobile device.

BACKGROUND

Mobile devices, such as smartphones, cellular or mobile phones, tablets, personal data assistants, and other portable devices, are now ubiquitous. Cases are typically used to protect the mobile device.

BRIEF SUMMARY

One embodiment is a case for a mobile device that includes a flexible covering defining a cavity configured for receiving and holding the mobile device; a rigid frame at least partially disposed within the flexible covering, where at least one first portion of the rigid frame is covered on one of two opposing sides by the flexible covering and exposed on another of the two opposing sides and at least one second portion of the rigid frame is exposed on both of the two opposing sides; and an adapter disposed at least partially within the rigid frame and the flexible covering, the adapter including a plurality of first contacts for coupling to contacts of an external device, a male plug extending into the cavity defined by the flexible covering and configured for insertion into a female socket of the mobile device, and a plurality of second contacts disposed on the male plug and electrically coupled to the first contacts of the adapter; where the adapter, in combination with at least one of the flexible covering or the rigid frame, defines a first male structure extending away from the cavity defined by the flexible covering of the case and configured for coupling to the external device, where the first contacts of the adapter are disposed on the first male structure.

In at least some embodiments, the first male structure is defined by the adapter, the flexible covering, and the rigid frame. In at least some embodiments, the first male structure includes a base and a second male structure extending away from the base, wherein the first contacts of the adapter are disposed on the second male structure. In at least some embodiments, the adapter further includes a female connector having an opening disposed in the base of the first male structure, wherein the female connector is electrically coupled to the male plug of the adapter.

In at least some embodiments, the adapter further includes a female connector having an opening disposed in the first male structure, wherein the female connector is electrically coupled to the male plug of the adapter. In at least some embodiments, the adapter further includes a port and the case further includes a plug configured for insertion into either the port or the female connector.

In at least some embodiments, the rigid frame includes a back panel with a plurality of raised sections disposed on the back panel and at least one intermediate section between at least two of the raised sections, wherein the raised sections are exposed within the cavity and at least a portion of the at least one intermediate section is covered within the cavity. In at least some embodiments, the rigid frame includes a back panel and a sidewall section that extend from the back panel is configured to receive at least a portion of a lower part of the mobile device. In at least some embodiments, the rigid frame further includes adapter receptacle extending from the sidewall section, wherein the adapter receptacle is configured to receive at least a portion of the adapter and forms at least a portion of the first male structure.

Another embodiment is a case for a mobile device that includes a flexible covering defining a cavity configured for receiving and holding the mobile device; and an adapter disposed at least partially within the flexible covering, the adapter including a plurality of first contacts for coupling to contacts of an external device, a male plug extending into the cavity defined by the flexible covering and configured for insertion into a female socket of the mobile device, a plurality of second contacts disposed on the male plug and electrically coupled to the first contacts of the adapter, and a female connector electrically coupled to the second contacts and having an opening; where the adapter and the flexible covering define a first male structure extending away from the cavity defined by the flexible covering of the case and configured for coupling to the external device, where the first contacts of the adapter and the opening of the female connector are disposed on the first male structure.

In at least some embodiments, the case further includes a rigid frame at least partially disposed within the flexible covering, wherein at least one first portion of the rigid frame is covered on one of two opposing sides by the flexible covering and exposed on another of the two opposing. In at least some embodiments, the rigid frame includes a back panel with a plurality of raised sections disposed on the back panel and at least one intermediate section between at least two of the raised sections, wherein the raised sections are exposed within the cavity and at least a portion of the at least one intermediate section is covered within the cavity. In at least some embodiments, the rigid frame includes a back panel and a sidewall section that extend from the back panel is configured to receive at least a portion of a lower part of the mobile device. In at least some embodiments, the rigid frame further includes adapter receptacle extending from the sidewall section, wherein the adapter receptacle is configured to receive at least a portion of the adapter and forms at least a portion of the first male structure.

In at least some embodiments, the first male structure includes a base and a second male structure extending away from the base, wherein the first contacts of the adapter are disposed on the second male structure. In at least some embodiments, the adapter further includes a port and the case further includes a plug configured for insertion into either the port or the female connector.

Yet another embodiment is a system that includes any of the cases described above and a mobile device having the female socket and receivable within the cavity of the case.

A further embodiment is a system that includes any of the cases described above and an external device having a connector configured for electrically coupling to the first contacts of the adapter of the case.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to cases for a mobile device. The present invention is also directed to a case for a mobile device that includes a flexible covering, a rigid frame, and an adapter with contacts that electrically couple to the mobile device.

Figure 1A:
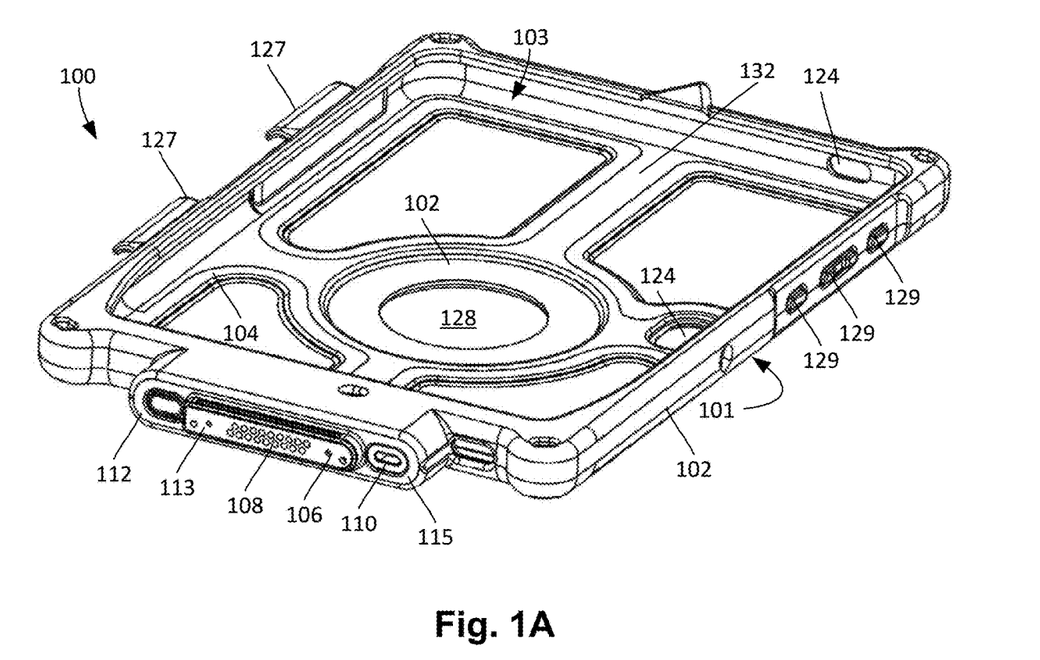
FIG. 1A is a schematic perspective view of a first embodiment of a case for a mobile device, according to the invention.
Figure 1B:
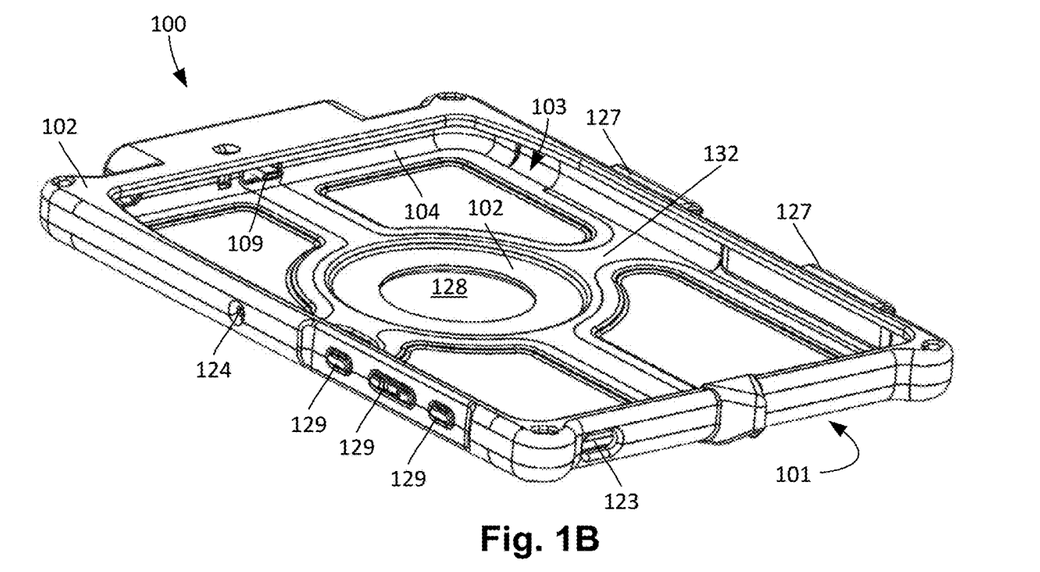
FIG. 1B is a schematic perspective view of the case of FIG. 1A from a different angle, according to the invention.

FIGS. 1A and 1B illustrate one embodiment of a case 100 for a mobile device, such as a cellular or mobile phone, a smartphone, a tablet, a personal data assistant, or any other suitable mobile device. The case 100 includes a flexible covering 102 which defines a cavity 103 to receive the mobile device, a rigid frame 104 disposed at least partially within the flexible covering, and an adapter 106 disposed at least partially within the flexible covering and the rigid frame. The adapter 106 includes first contacts 108 for coupling to an external device (not shown), such as a docking device, a male plug 109 for insertion into a female socket of the mobile device, and second contacts 142 (FIGS. 5A and 5B) disposed on the male plug. The second contacts 142 of the male plug 109 are electrically coupled to the first contacts 108 so that the adapter can carry power or data or both between the external device and the mobile device. The adapter 106 optionally includes a female connector 110, such as a USB-A, USB-B, USB-C, Micro-USB, Mini-USB, or Lightning connector or the like. The adapter 106 and at least one of the rigid frame 104 or the flexible covering 102 form a first male structure 112 extending away from the cavity. The terms "flexible" and "rigid", when used in the context of "flexible covering" and "rigid frame", are intended to be relative to each other, such that the flexible covering feels more flexible, as judged by an average adult user, than the rigid frame and the rigid frame is more rigid, as judged by the average adult user, than the flexible cover.

Optionally, the adapter (and optionally one or both of the flexible covering 102 or rigid frame 104) forms, as part of the first male structure 112, a second male structure 113 extending out of a base 115 of the first male structure 112. In at least some embodiments, the first male structure 112 or second male structure 113 (or both) are configured for coupling to a female connector (not shown) or any other suitable connector of the external device. In the illustrated embodiment of FIGS. 1A and 1B, regions 124, 128 are open.

Figure 1C:
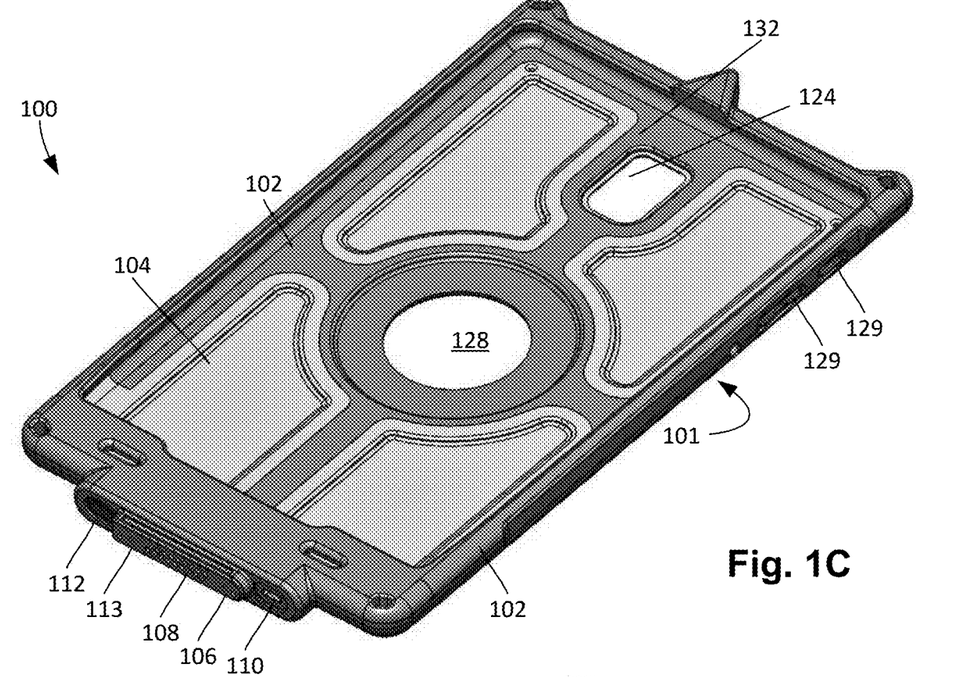
FIG. 1C is a schematic perspective front view of a second embodiment of a case for a mobile device, according to the invention.
Figure 1D:
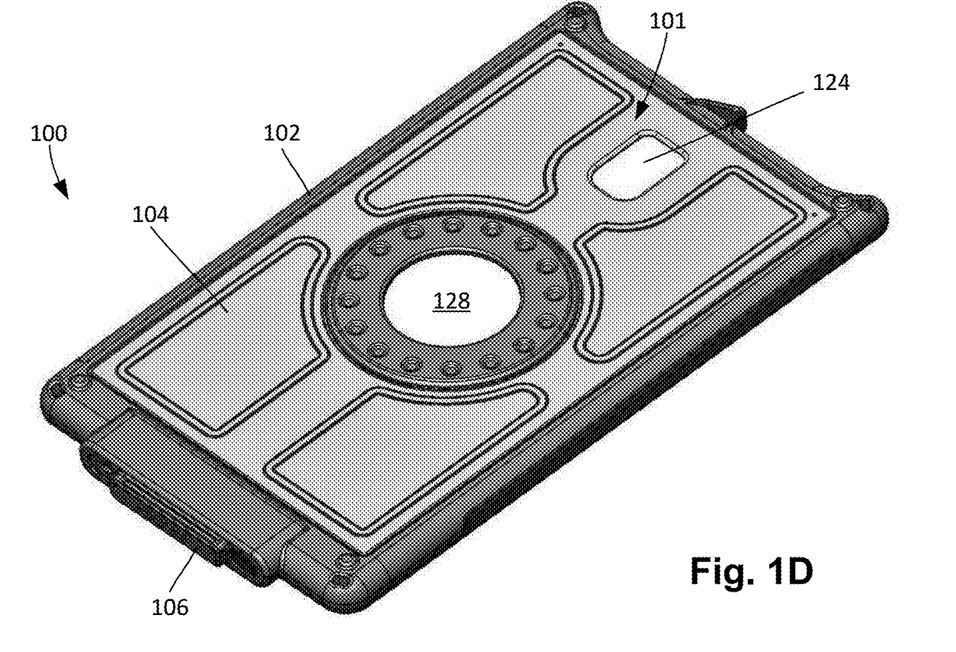
FIG. 1D is a schematic perspective back view of the case of FIG. 1C, according to the invention.

FIGS. 1C and 1D are front and back views of a second embodiment of a cover 100 with flexible covering 102, rigid frame 104, and adapter 106 in a similar, but different, arrangement. FIGS. 1C and 1D use shading to distinguish the flexible covering 102 (lighter shading) and rigid frame 104 (darker shading) and open regions 124, 128.

The flexible covering 102 can be made of any suitable flexible, plastic material including, but not limited to, thermoplastic elastomeric polymer materials, other suitable flexible or elastomeric polymer materials, or the like or any combination thereof. In at least some embodiments, the flexible covering 102 is molded over or around the rigid frame 104. In at least some embodiments, the rigid frame 104 can be an insert and the flexible covering 102 can be insert molded over or around the rigid frame. In at least some embodiments, the molding facilitates adherence of the flexible covering 102 to the rigid frame 104. In at least some embodiments, materials of the flexible covering 102 and rigid frame 104 are selected to facilitate the adherence. In at least some embodiments, the flexible covering 102 may be attached to the rigid frame 104 using adhesive, heat treatment, or the like or any combination thereof.

When the mobile device is received in the case 100, the flexible covering 102 is arranged to cover at least a portion of all the side surfaces of the mobile device and to extend over at least a portion (or all) of the peripheral edges of the front and back surfaces of the mobile device to hold the mobile device in the case and to provide protection to the mobile device. In at least some embodiments, the flexible covering 102 includes one or more curved extensions 127 to receive and hold a stylus or other device. Optionally, the flexible covering 102 can include one or more soft buttons 129 that are positioned in the flexible covering to coincide with positions (or possible positions) of buttons on the mobile device. The soft buttons 129 are arranged so that depression of the soft buttons with sufficient force results in depression of the buttons of a mobile device received in the case 100. The flexible covering 102 can also include one or more openings 123 to provide access to a speaker, a microphone, a camera, a light, a jack, or the like on the mobile device.

Figure 2:
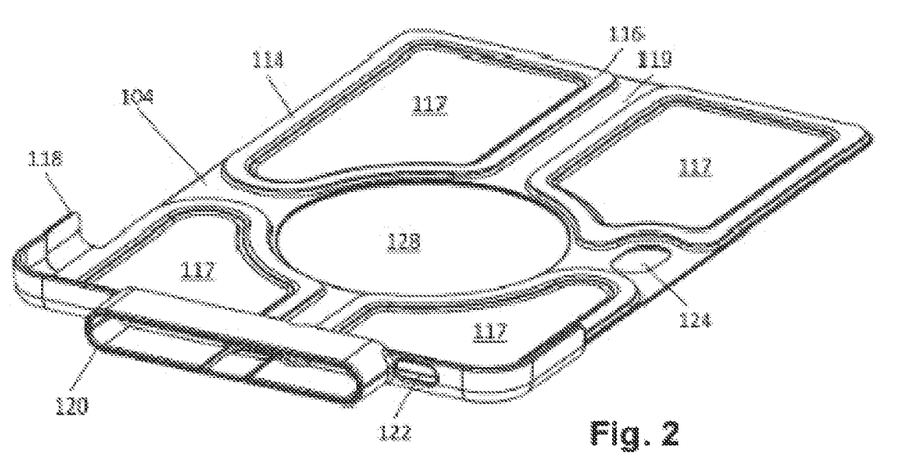
FIG. 2 is a schematic perspective view of a rigid frame of the case of FIG. 1A, according to the invention.

FIG. 2 illustrates only the rigid frame 104 of the cover 100 of FIGS. 1A and 1B. The illustrated embodiment of the rigid frame 104 includes a back panel 114 and a sidewall section 118 that extends from the back panel 114 and is configured to receive the lower portion of the mobile device. In at least some embodiments, the back panel 114 includes raised sections 116 surrounding first indented sections 117, as well as second indented sections 119 between the raised sections 116. The back panel 114 can provide protection or support to the back portion of the mobile device and the sidewall section 118 can provide protection or support to the bottom and lower portion of the mobile device.

When the flexible covering is disposed (for example, molded) over the rigid frame 104, one or more partially exposed sections of the rigid frame will be covered on one of two opposing sides (for example, either the interior or exterior side where the interior side is the side facing the cavity 103 and the exterior side is the side on or facing a back exterior 101 (FIG. 1A) of the case 100) by the flexible covering leaving the other one of the opposing sides exposed. In addition, the rigid frame 104 may include one or more fully exposed sections that are not covered on either of the two opposing sides by the flexible covering and, optionally, one or more covered sections that are covered on both of the two opposing sides by the flexible covering.

Referring to FIGS. 1C and 1D, in this embodiment, portions 132 of the flexible covering 102 are disposed over the second indented sections 119 between the raised sections 116 of the rigid frame 104 so that those portions of the rigid frame are covered on the interior side by the flexible covering. These second indented sections 119 of the rigid frame are partially exposed sections of the rigid frame as described above. In addition, most or all of the sidewall section 118 of the rigid frame 104 is covered on the exterior side by the flexible covering 102 leaving the interior side exposed so that these first portions of the rigid frame also are partially exposed sections of the rigid frame as described above. Other parts of the back panel 114 of the rigid frame 104 are exposed on both the front and back sides so that these second portions of the rigid frame are fully exposed sections of the rigid frame as described above. In at least some embodiments, third portions of the rigid frame 104 along the edges of the rigid frame may be covered by the flexible covering 102 on both opposing sides corresponding to the covered sections of the rigid frame described above.

The rigid frame 104 also includes an adapter receptacle 120 extending from the sidewall section 118 for receiving the adapter 106 and for protecting or supporting the adapter 106. The rigid frame 104 can also include one or more openings 122, 124 through the rigid frame for access to buttons, a camera, a connector, or the like of the mobile device.

The rigid frame 104 can be made of any suitable rigid material including, but not limited to, rigid plastics, metal, or the like or any combination thereof.

Figure 3A:
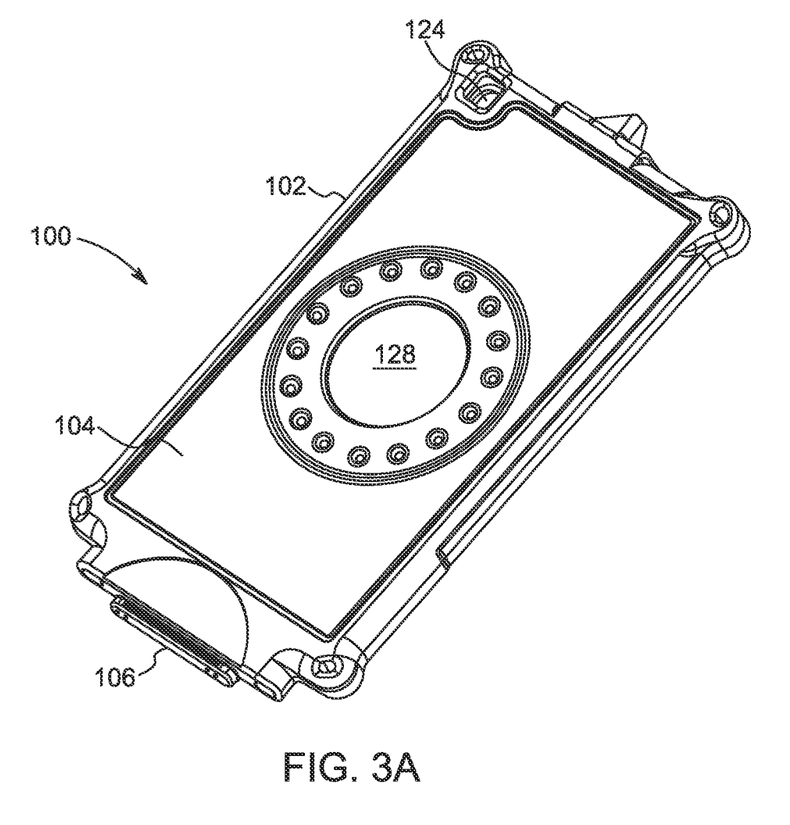
FIG. 3A is a schematic perspective back view of a third embodiment of a case for a mobile device, according to the invention.
Figure 3B:
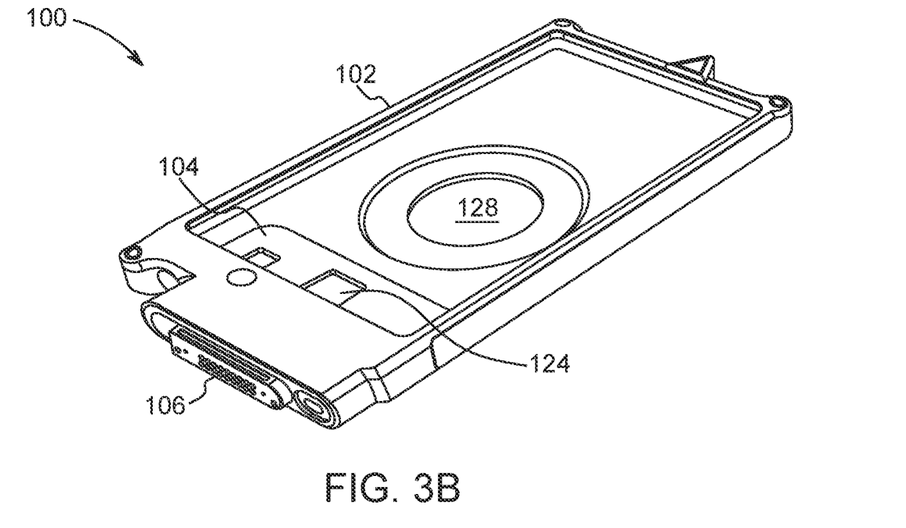
FIG. 3B is a schematic perspective front view of a fourth embodiment of a case for a mobile device, according to the invention.
Figure 3C:
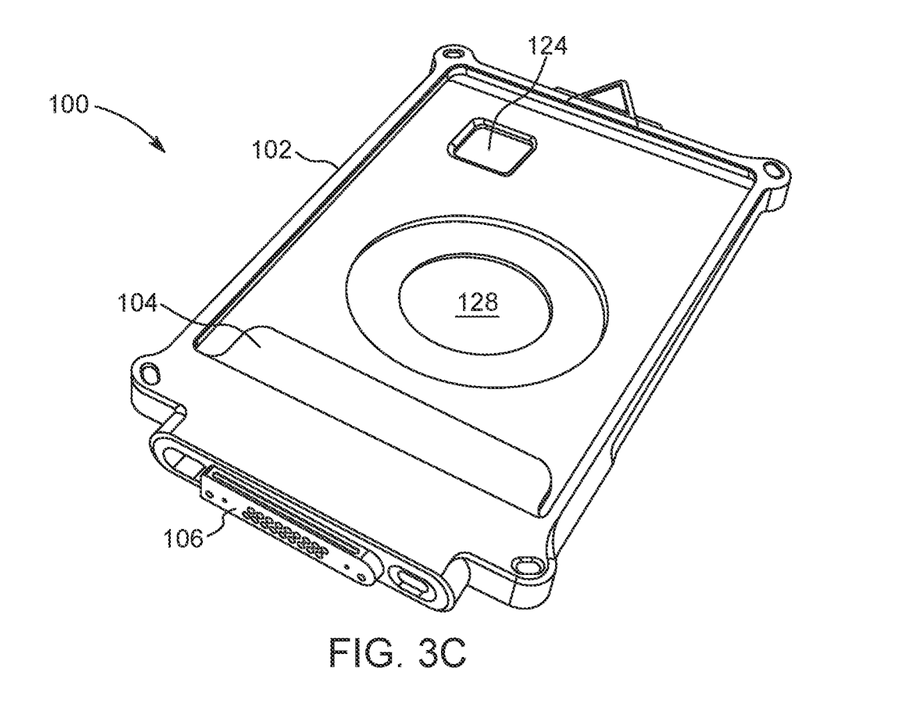
FIG. 3C is a schematic perspective front view of a fifth embodiment of a case for a mobile device, according to the invention.
Figure 3D:
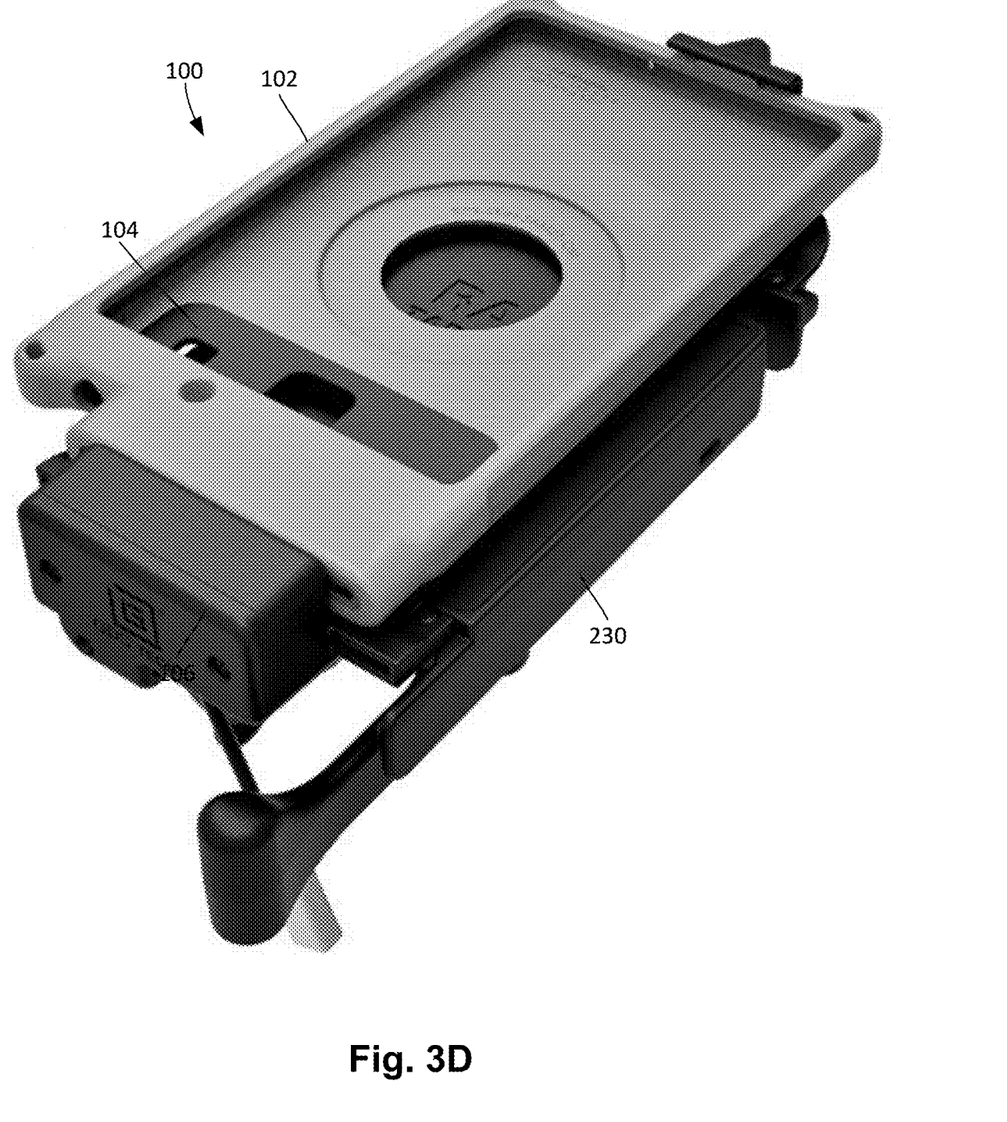
FIG. 3D is a schematic perspective front view of a sixth embodiment of a case for a mobile device where the case is disposed in an external device (in this case a docking device), according to the invention.

FIG. 3A, which is a back view, and FIGS. 3B, 3C, and 3D, which are all front views, illustrate four additional embodiments of a case 100 with different arrangements of the flexible covering 102 and rigid frame 104. In particular, these embodiments illustrate different configurations of open regions 124, 128, as well as which regions of the rigid frame 104 are exposed through the flexible covering 102. FIGS. 1D and 3A illustrate embodiments in which the rigid frame 104 is exposed and forms part of the back exterior 101 of the case 100. In at least some other embodiments, the flexible covering 102 forms the back exterior 101 of the case 100 with the rigid frame primarily or only exposed at the interior 103 of the case. FIG. 3D illustrates one embodiment of a docking device 230 coupled to the case 100. Examples of other embodiments of external devices, such as a docking device (also referred to as a docking cradle), and a female connector of an external device can be found in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334, all of which are incorporated herein by reference in their entireties.

Figure 4A:
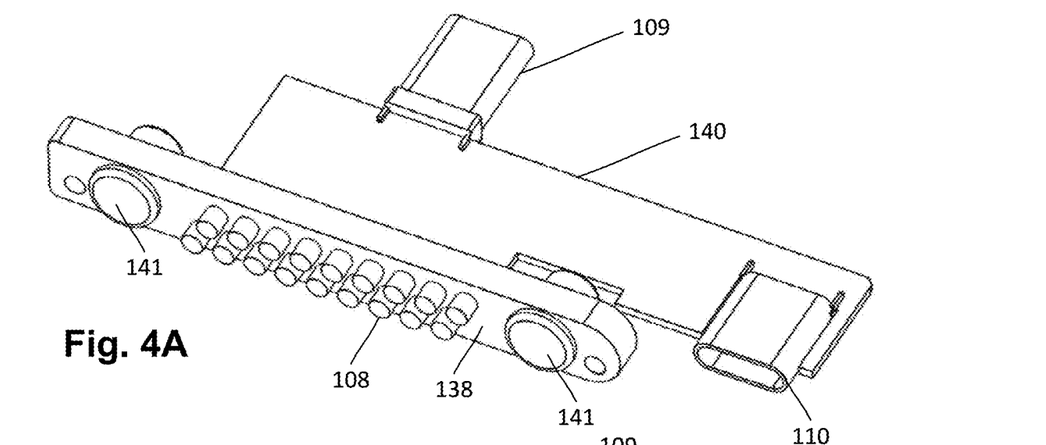
FIG. 4A is a schematic perspective view of a portion of an adapter of the case of FIG. 1A, according to the invention.
Figure 4B:
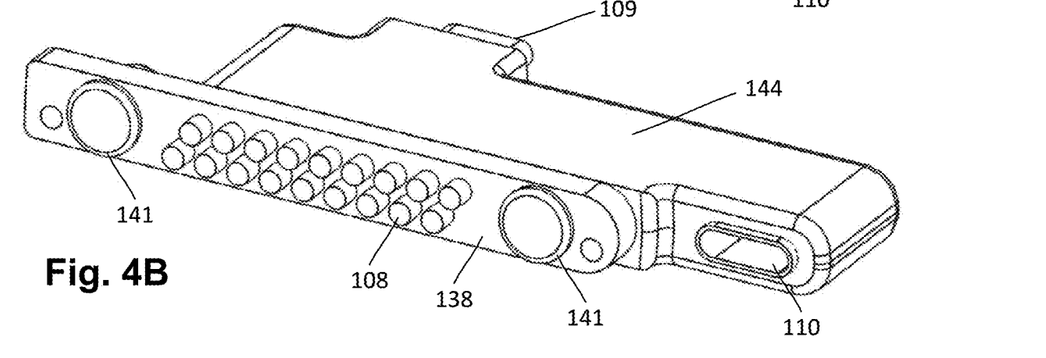
FIG. 4B is a schematic perspective view of a portion of the adapter of FIG. 4A with an overmold disposed over a substrate, female connector, a portion of a male plug of the adapter, according to the invention.
Figure 4C:
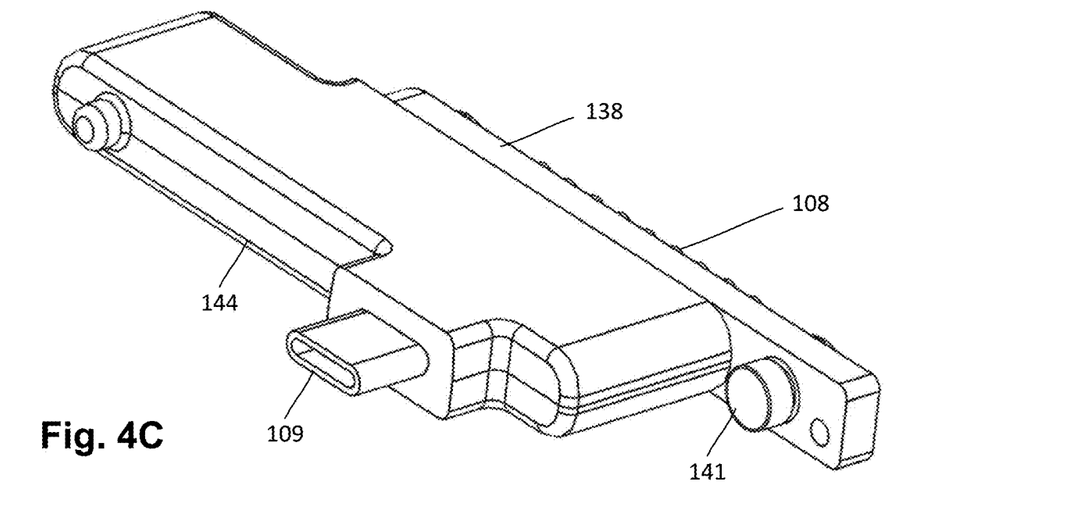
FIG. 4C is schematic perspective view of the portion of the adapter of FIG. 4B from a different angle, according to the invention.

FIG. 4A illustrates a portion of the adapter 106 which includes the male plug 109 for coupling to a female connector of the mobile device, the first contacts 108 for coupling to contacts of an external device, a contact support 138, the female connector 110, a substrate 140 (such as a printed circuit board) for carrying conductors (not shown—for example, conductive traces or wires) that couple the first contacts 108 and the female connector 110 to the male plug 134, and one or more optional magnetic elements 141. The optional magnetic elements 141 can be made of either magnetic material or magnetically attracted material (for example, a ferromagnetic material). In at least some embodiments, the external device can include magnetic elements that magnetically interact with the magnetic elements 141 of the adapter 106, as described in more detail in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334, all of which are incorporated herein by reference in their entireties. FIGS. 4B and 4C illustrate an overmold 144 disposed over the substrate 140, female connector 110, and a portion of the male plug 109.

FIGS. 4A to 4C illustrate one arrangement of the first contacts 108 of the cover 100. In this arrangement, there are eighteen first contacts 108 arranged in two rows. In the illustrated embodiment, the rows are staggered, but it will be recognized that the rows can be aligned with each other, instead of staggered. The external device can have the same number and arrangement of electrical contacts although in some embodiments, the external device may have fewer or more contacts than the cover 100. It will be understood that the cover 100 can include any number of first contacts 108 including, but not limited to, two, three, four, five, six, seven, eight, nine, ten, twelve, fourteen, sixteen, eighteen, twenty, or more first contracts. The first contacts 108 can be arranged in any regular or irregular pattern. For example, three first contacts can be arranged in a straight line, an equilateral triangle, an isosceles triangle, a right triangle, or any other suitable arrangement. As another example, some or all of the first contacts 108 can be arranged at vertices of a regular or irregular polygon, such as a pentagon, hexagon, or octagon.

Figure 5A:
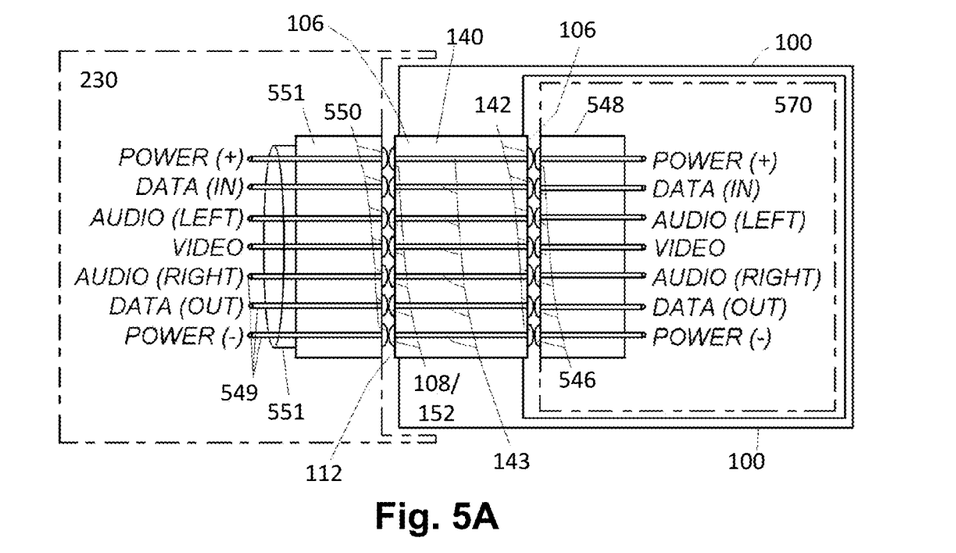
FIG. 5A is a block diagram of a first embodiment of electrical connection between an external device, an adapter of the case of FIG. 1A, and a mobile device when the mobile device is received in the case and the external device is electrically coupled to the adapter of the case, according to the invention.

FIG. 5A is a block diagram of one embodiment of electrical connection between the external device 230, adapter 106, and mobile device 570 when the mobile device is received in the case 100 and the external device is electrically coupled to the adapter of the case. In this embodiment, the first contacts 108 of the adapter are coupled to the second contacts 142 on the male plug 109 through conductors 143 that are sequentially ordered. As illustrated, contacts 546 in a female socket 548 of the mobile device 570 are electrically coupled to the second contacts 142 on the male plug 109 of the adapter and contacts 550 (which are, optionally, in a female connector 551 or other connector) of the external device 230 are coupled to the first contacts 108 of the adapter 106. FIG. 5A illustrates one example of an arrangement 549 of these contacts as assigned to particular inputs/outputs. It will be recognized that other assignments of inputs/outputs or arrangements of assignments of inputs/outputs can be used.

Figure 5B:
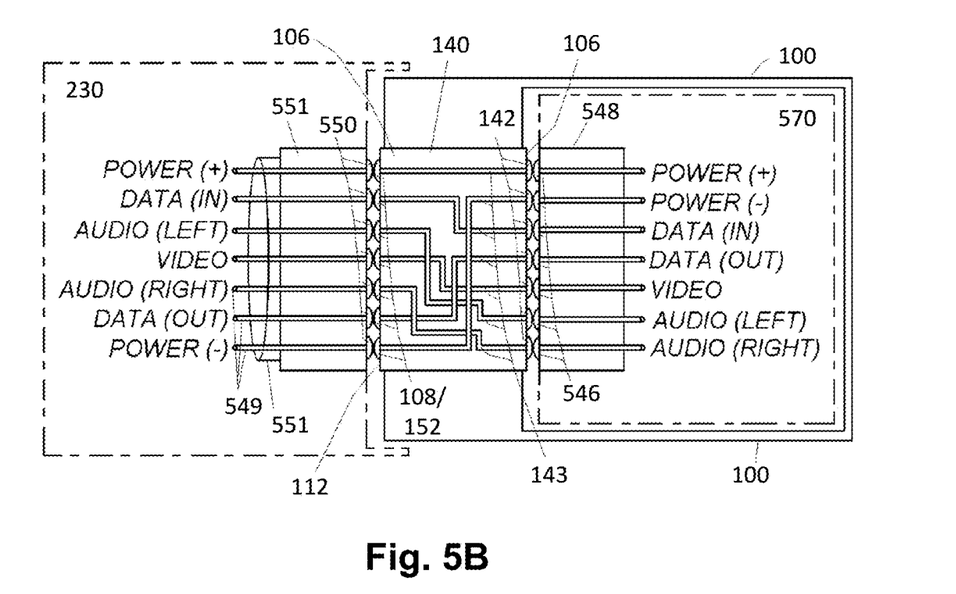
FIG. 5B is a block diagram of a second embodiment of electrical connection between an external device, an adapter of the case of FIG. 1A, and a mobile device when the mobile device is received in the case and the external device is electrically coupled to the adapter of the case, according to the invention.

FIG. 5B is a block diagram of another embodiment of electrical connection between the external device 230, adapter 106, and mobile device 540. In this embodiment, the first contacts 108 are coupled to the second contacts 142 in a non-sequential relationship with at least some of the conductors 143 overlapping (with intervening insulation). Accordingly, the adapter 106 can be used to couple a specific type of mobile device to a universal external device by rearranging the inputs/outputs from the mobile device to the arrangement of inputs/outputs of the universal external device, such as a docking device or docking cradle. This allows the universal external device to be used with a variety of mobile devices by selection of the appropriate adapter to convert the arrangement of inputs/outputs from the mobile device to the universal external device.

Although FIGS. 5A and 5B illustrate the coupling of the first contacts 108 to the second contacts 142, it will be recognized that a similar arrangement of conductors 143 can be used to couple the contacts 152 of the female connector 110 to the second contacts 142 of the male plug 109 of the adapter 106, as illustrated in FIGS. 5A and 5B (using the reference "108/152"). In some embodiments, the female connector 110 is identical to the female socket 548 of the mobile device 540. For example, if the female socket of the mobile device is a USB C type socket, then the female connector is also USB C. In other embodiments, the female connector 110 is a different type or connector, or has a different input/output arrangement, from the female socket 548 of the mobile device 540.

In some embodiments, the rigid frame 104 can be excluded from the case 100 to provide a flexible covering 102 with an adapter 106 having the female connector 110 in addition to the first male structure 112 (and optional second male structure 113) and first contacts 108. The first contacts 108 and the female connector 110 provide two different connector arrangements for coupling the case 100 (and the mobile device 540 received in the case) to the external device 230. Examples of other flexible cases (or covers) that can be modified to include and adapter 106 with the female connector 110 can be found U.S. Pat. Nos. 9,195,279; 9,331,444; 9,529,387; 9,602,639; 9,632,535; 9,706,026; 10,050,658; 10,054,984; 10,389,399; 10,454,515; and 10,630,334, all of which are incorporated herein by reference in their entireties. For example, those flexible cases (or covers) can be modified to replace the adapter described therein with the adapter 106 that includes the female connector.

Figure 6:
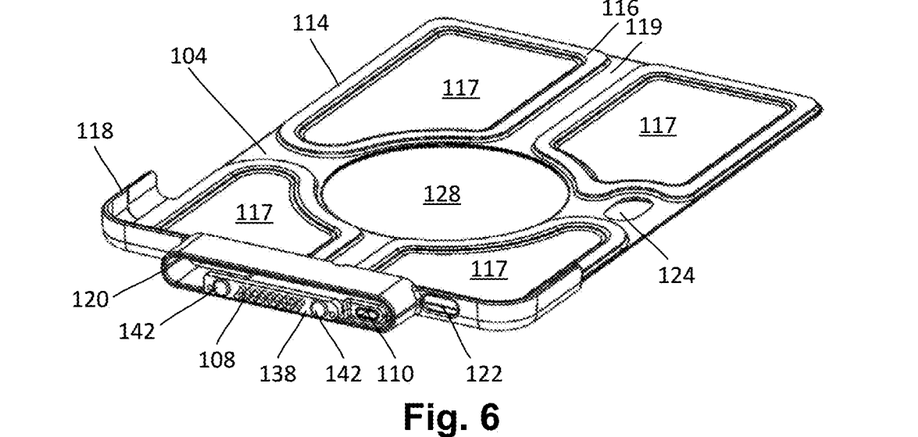
FIG. 6 is a schematic perspective view of a rigid frame and adapter of the case of FIG. 1A, according to the invention.
Figure 7A:
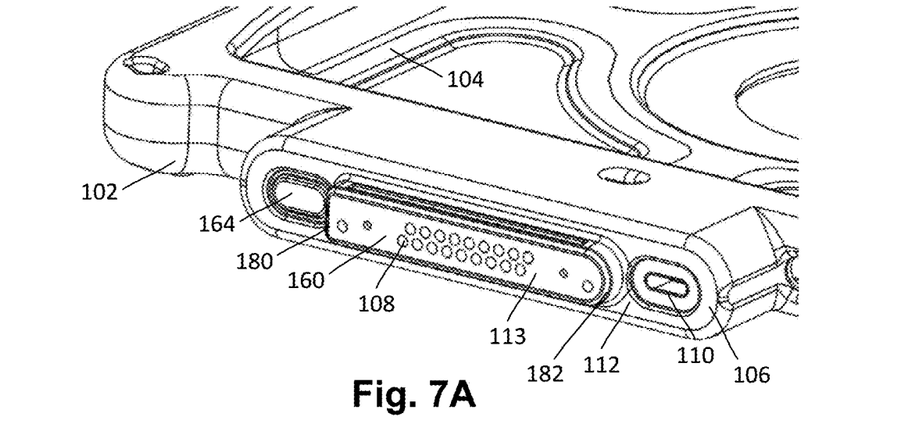
FIG. 7A is schematic perspective close-up view of a portion of the case of FIG. 1A focusing on a region of the adapter of the case, according to the invention.
Figure 7B:
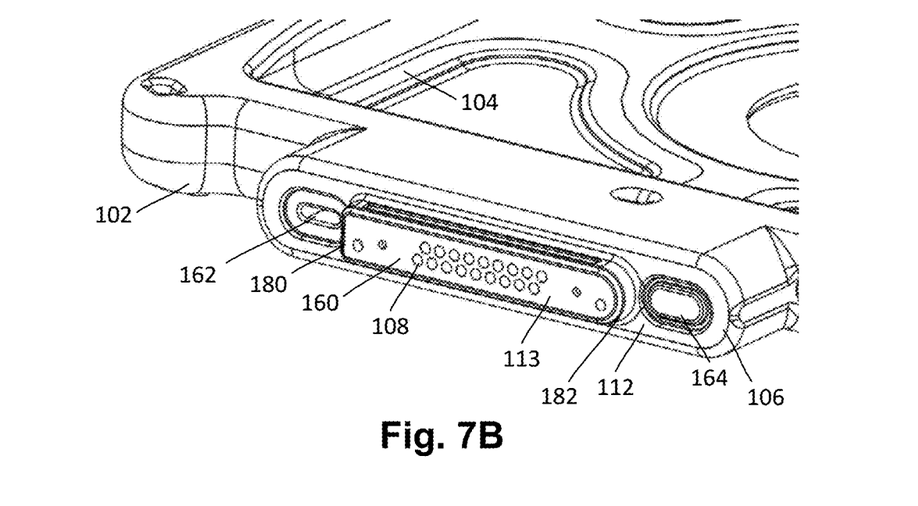
FIG. 7B is schematic perspective close-up view of a portion of the case of FIG. 1A focusing on a region of the adapter of the case where a plug has been removed from a port and placed in a female connector, according to the invention.

FIG. 6 illustrates the adapter 106 inserted into the adapter receptacle 120 of the rigid frame 104. FIGS. 7A and 7B are close-up views with the flexible covering 102 molded (or otherwise disposed) over the adapter 106. In at least some embodiments, the flexible covering 102 can form a platform 160 around the contacts 108 and over the one or more optional magnetic elements 141 (FIG. 4A) and contact support 138 (FIG. 4A). The flexible covering 102 can also form an optional port 162. In other embodiments, the platform 160 or the port 162 or both can be formed of another flexible or rigid polymer material.

In at least some embodiments, the port 162 can be similar in size and shape to the female connector 110 and the case 100 can include a plug 164 that can fit snugly in either the port or the female connector 110. The plug 164 may be useful to cover the female connector 110 when not in use. When the female connector 110 is in use, the plug 164 can be inserted into the port 162 so that it is not lost.

In at least some embodiments, the platform 160, second male structure 113, or first male structure 112 can have an asymmetric shape that can facilitate correctly coupling the case 100 to the external device. In the embodiment illustrated in FIG. 6, the platform 160, second male structure 113, or first male structure 112 has a first edge 180 that is straight and a second edge 182, opposite the first edge, that is curved. A female connector of the external device can be shaped similarly to the platform 160, second male structure 113, or first male structure 112 so that the platform 160, second male structure 113, or first male structure 112 of the case only fits easily into the female connector of the docking cradle in one orientation. This asymmetric the platform 160, second male structure 113, or first male structure 112 of the case 100 facilitates correct coupling of the case with an external device so that the first contacts 108 correctly and reliably mate with corresponding contacts on the external device.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A case for a mobile device, the case comprising:
a flexible covering defining a cavity configured for receiving and holding the mobile device;
a rigid frame at least partially disposed within the flexible covering and comprising a back panel, wherein at least one first portion of the back panel of the rigid frame is covered on one of two opposing sides of the rigid frame by the flexible covering and exposed on another of the two opposing sides of the back panel, at least one second portion of the back panel of the rigid frame is exposed on both of the two opposing sides of the back panel, and at least one third portion of the back panel of the rigid frame is covered on both of the two opposing sides of the back panel by the flexible covering; and
an adapter disposed at least partially within the rigid frame and the flexible covering, the adapter comprising a plurality of first contacts for coupling to contacts of an external device, a male plug extending into the cavity defined by the flexible covering and configured for insertion into a female socket of the mobile device, and a plurality of second contacts disposed on the male plug and electrically coupled to the first contacts of the adapter;
wherein the adapter, in combination with at least one of the flexible covering or the rigid frame, defines a first male structure extending away from the cavity defined by the flexible covering of the case and configured for coupling to the external device, wherein the first contacts of the adapter are disposed on the first male structure.

2. The case of claim 1, wherein the first male structure is defined by the adapter, the flexible covering, and the rigid frame.

3. The case of claim 1, wherein the first male structure comprises a base and a second male structure extending away from the base, wherein the first contacts of the adapter are disposed on the second male structure.

4. The case of claim 3, wherein the adapter further comprises a female connector having an opening disposed in the base of the first male structure, wherein the female connector is spaced apart from the first contacts and is electrically coupled to the male plug of the adapter.

5. The case of claim 1, wherein the adapter further comprises a female connector having an opening disposed in the first male structure, wherein the female connector is spaced apart from the first contacts and is electrically coupled to the male plug of the adapter.

6. The case of claim 5, wherein the adapter further comprises a port and the case further comprises a plug configured for insertion into either the port or the female connector.

7. A case for a mobile device, the case comprising:
a flexible covering defining a cavity configured for receiving and holding the mobile device;
a rigid frame at least partially disposed within the flexible covering, wherein at least one first portion of the rigid frame is covered on one of two opposing sides by the flexible covering and exposed on another of the two opposing sides, and at least one second portion of the rigid frame is exposed on both of the two opposing sides, wherein the rigid frame comprises a back panel with a plurality of raised sections disposed on the back panel and at least one intermediate section between at least two of the raised sections, wherein the raised sections are exposed within the cavity and at least a portion of the at least one intermediate section is covered within the cavity by the flexible covering; and
an adapter disposed at least partially within the rigid frame and the flexible covering, the adapter comprising a plurality of first contacts for coupling to contacts of an external device, a male plug extending into the cavity defined by the flexible covering and configured for insertion into a female socket of the mobile device, and a plurality of second contacts disposed on the male plug and electrically coupled to the first contacts of the adapter;
wherein the adapter, in combination with at least one of the flexible covering or the rigid frame, defines a first male structure extending away from the cavity defined by the flexible covering of the case and configured for coupling to the external device, wherein the first contacts of the adapter are disposed on the first male structure.

8. The case of claim 1, wherein the rigid frame further comprises a sidewall section that extends from the back panel is configured to receive at least a portion of a lower part of the mobile device.

9. The case of claim 8, wherein the rigid frame further comprises adapter receptacle extending from the sidewall section, wherein the adapter receptacle is configured to receive at least a portion of the adapter and forms at least a portion of the first male structure.

10. A system, comprising:
the case of claim 1; and
the mobile device having the female socket and receivable within the cavity of the flexible covering.

11. A system, comprising:
the case of claim 1; and
the external device having a connector configured for electrically coupling to the first contacts of the adapter of the case.

12. A case for a mobile device, the case comprising:
a flexible covering defining a cavity configured for receiving and holding the mobile device; and
an adapter disposed at least partially within the flexible covering, the adapter comprising a first connector having a plurality of first contacts for coupling to contacts of an external device, a male plug extending into the cavity defined by the flexible covering and configured for insertion into a female socket of the mobile device, a plurality of second contacts disposed on the male plug and electrically coupled to the first contacts of the first connector of the adapter, and a female connector spaced apart from the first connector and electrically coupled to the second contacts and having an opening;
wherein the adapter and the flexible covering define a first male structure extending away from the cavity defined by the flexible covering of the case and configured for coupling to the external device, wherein the first contacts of the first connector of the adapter and the opening of the female connector are disposed on the first male structure and spaced apart from each other.

13. The case of claim 12, further comprising a rigid frame at least partially disposed within the flexible covering, wherein at least one first portion of the rigid frame is covered on one of two opposing sides by the flexible covering and exposed on another of the two opposing sides.

14. The case of claim 13, wherein the rigid frame comprises a back panel with a plurality of raised sections disposed on the back panel and at least one intermediate section between at least two of the raised sections, wherein the raised sections are exposed within the cavity and at least a portion of the at least one intermediate section is covered within the cavity by the flexible covering.

15. The case of claim 13, wherein the rigid frame comprises a back panel and a sidewall section that extend from the back panel is configured to receive at least a portion of a lower part of the mobile device.

16. The case of claim 15, wherein the rigid frame further comprises an adapter receptacle extending from the sidewall section, wherein the adapter receptacle is configured to receive at least a portion of the adapter and forms at least a portion of the first male structure.

17. The case of claim 12, wherein the first male structure comprises a base and a second male structure extending away from the base, wherein the first contacts of the first connector of the adapter are disposed on the second male structure.

18. The case of claim 12, wherein the adapter further comprises a port and the case further comprises a plug configured for insertion into either the port or the female connector.

19. A system, comprising:
the case of claim 12; and
the mobile device having the female socket and receivable within the cavity of the flexible covering.

20. A system, comprising:
the case of claim 12; and the external device having a connector configured for electrically coupling to the first contacts of the adapter of the case.

\* \* \* \* \*